United States Patent [19]

Strobel

[11] 4,150,724
[45] Apr. 24, 1979

[54] ROTARY STALK CHOPPER APPARATUS
[76] Inventor: Dwight W. Strobel, Clarks, Nebr. 68628
[21] Appl. No.: 923,061
[22] Filed: Jul. 10, 1978

Related U.S. Application Data
[63] Continuation of Ser. No. 744,702, Nov. 24, 1976, abandoned.
[51] Int. Cl.² ............................................. A01B 21/00
[52] U.S. Cl. .................................. 172/328; 172/413; 172/552; 172/687
[58] Field of Search ............... 172/184, 187, 324, 328, 172/413, 550, 552, 581, 582, 611, 679, 680, 685, 687, 689, 694, 696, 697; 56/501, 502, 504, 505, 500

[56] References Cited
U.S. PATENT DOCUMENTS

| 308,306 | 11/1884 | Davis et al. | 172/552 |
| 1,287,374 | 12/1918 | McHam | 172/552 X |
| 1,353,626 | 9/1920 | Bromfield | 172/552 |
| 2,118,363 | 5/1938 | Schwarz | 172/552 |
| 2,741,887 | 4/1956 | Denton | 172/552 |
| 2,771,306 | 11/1956 | Ash | 172/582 X |
| 3,812,919 | 5/1974 | Baughman et al. | 172/328 |

FOREIGN PATENT DOCUMENTS

| 153341 | 11/1951 | Australia | 172/552 |
| 530095 | 9/1921 | France | 56/504 |

Primary Examiner—Richard T. Stouffer

[57] ABSTRACT

A tongue drawn rotary apparatus for chopping vegetation and for churning and working the soil, including individually supported shredder reels mounted on a frame, which frame may be lowered and raised in response to a wheel retraction and extension rocker mechanism, which mechanism also provides firm and resilient support to the tongue.

9 Claims, 4 Drawing Figures

ROTARY STALK CHOPPER APPARATUS

This is a continuation of application Ser. No. 744,702, filed Nov. 24, 1976, now abandoned.

BACKGROUND OF THE INVENTION

The present invention relates generally to agricultural implements and more particularly to tractor pulled, rotary apparatus for chopping vegetation and for churning and working the soil prior to and in preparation for a subsequent planting.

Extant grain harvesting machinery functions, in general, tp pick the grain crop, to remove the grain from the stalk and from the hull, to separate and store the grain, and to discharge waste parts of the plant back into the field. Frequently, various types of baling machinery are then utilized to pick up and bale the discharged waste to reclaim it for other purposes. What remains in the field is largely the stubble.

The stubble itself, however, is also useful, as it will decay in time and return nutrients to the soil. Also, decayed stalks, especially when finally divided, provide water absorption and retention means to preserve moisture within the top soil, thereby to serve as a moisture reservoir for the growing plant. Such decayed stalks act further to maintain the soil in a sufficiently loose condition to facilitate planting, cultivating, fertilizing, and ultimately crop growth. Hence, it is desirable to return the stubble to the soil finely divided and in as efficient a manner as is possible.

Certain difficulties have been associated with the prior art devices for chopping stalks and stubble. Among those difficulties have been a lack of efficiency and adjustability chopping, slowness of operation, and the necessity for an to varying terrain and soil conditions, incompleteness of excessive amount of manual adjustment and control in their operation.

In view of these and other difficulties associated with prior art devices, it is an object of the rotary stalk chopper apparatus of the present inventon to provide an apparatus which materially alleviates those difficulties.

It is an additional object of the present invention to provide a rotary stalk chopper apparatus which provides efficiency in use, speed and safety of operation, adjustability to varying terrain and soil conditions, and requires a minimum of manual adjustment and control.

SUMMARY OF THE INVENTION

The rotary chopper of the present invention comprises a horizontally disposed and rigid frame which supports a plurality of rotary shredder reels disposed across the frame and in tandem. The frame is supported by wheels which are retractable to lower the frame for engagement with the soil and which are extendable to raise the frame to disengage the rotary shredder reels from the earth for transportation of the apparatus.

The rotary shredder reels are supported individually by downwardly extending shaft support plates which depend from the frame. Each shaft support plate carries bearings which journal for rotation the ends of the reel shafts. A preferably laterally adjustable tongue is hinged to the front portion of the frame for limited radial motion about the longitudinal axis of the frame front.

Apparatus in accordance with the present invention includes a wheel extension and retraction mechanism having a rocker shaft disposed longitudinally along the frame and journaled for turning in bearing carried by the frame. Wheel struts carrying wheels extend downwardly and backwardly from the rocker shaft. A rocker lever arm is fixedly secured to the rocker shaft for radially turning the rocker shaft. A drive means, preferably in the form of a hydraulic cylinder, supplies force to the rocker lever arm for turning the rocker shaft, thereby to extend or retract the wheels for transportation and chopping respectively.

In a preferred embodiment the hydraulic cylinder is also operatively connected at the opposite end thereof to the tongue for urging the tongue upwardly simultaneously to retracting the wheels for engagement of the rotary shredders with the earth, so that the tongue will be automatically firmly supported both during transportation and during rotary operation and will be rendered substantially level during chopping for uniformity of weight distribution over the front and back disposed shredder reels.

In each rotary shredder reel a plurality of shredder blades extend longitudinal of the shaft and radially protrude therefrom. When the frame is pulled over the surface of the earth, the shredder blades turn and chop any stalks within their path while simultaneously working the earth. Preferably, the front rotary shredder reels have a different number of rotary blades from the back reels, in order to prevent tracking and missing of any stalks present. Additionally, supplementary weight may be applied to the apparatus by filling containers carried by the frame.

Various modifications of the present invention are intended to be embodied and will become apparent to those skilled in the art from the teaching of the principles of the invention in connection with the disclosure of the specification, the claims and the drawing.

DETAILED DESCRIPTION OF THE PREFERRED EMBODIMENTS

Figure 1:
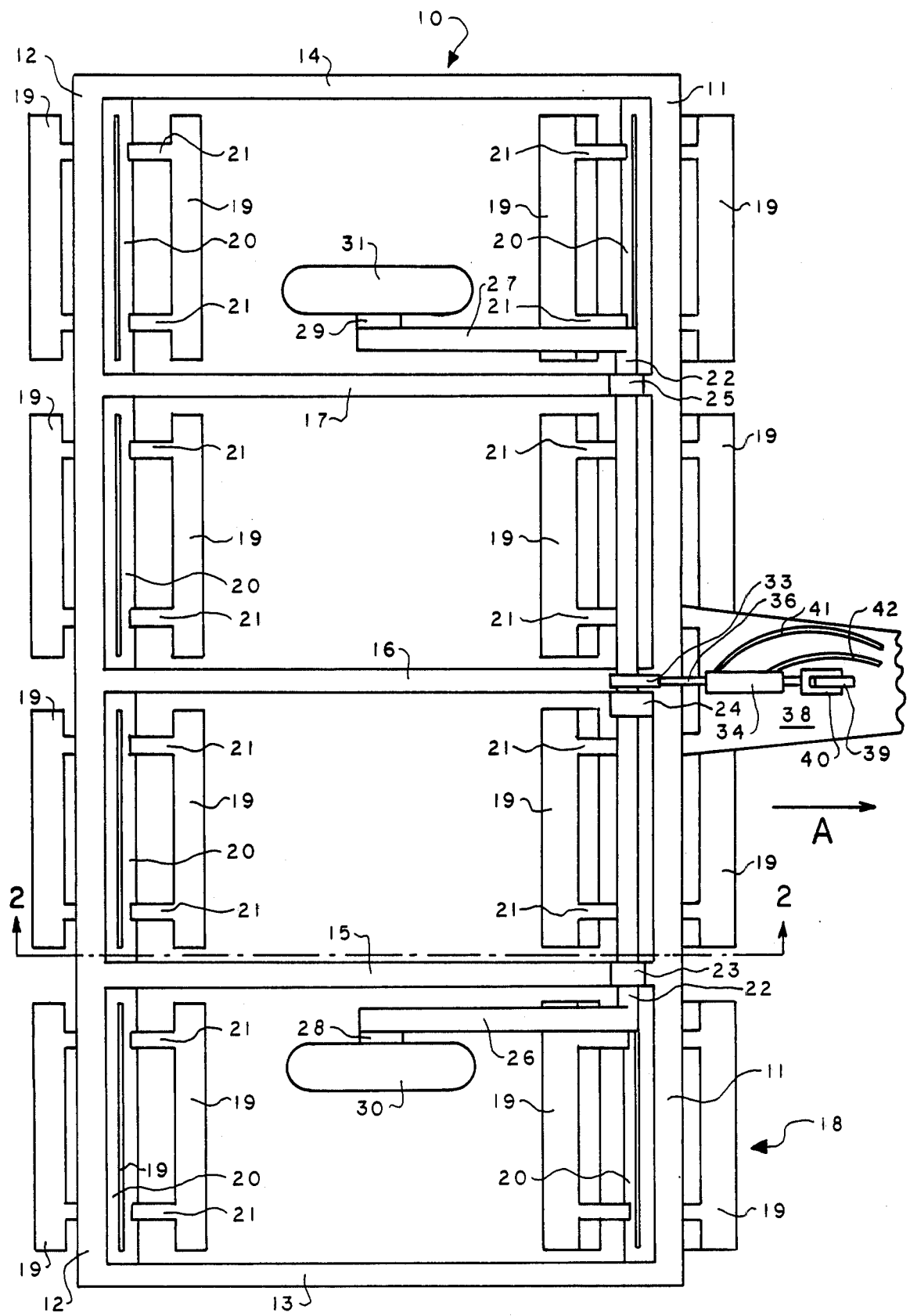
FIG. 1 is a plan view of the rotary stalk chopper of the present invention, showing the frame, the rotary shredders, the wheels, and wheelextending and retracting means, the tongue and the drive means.
Figure 2:
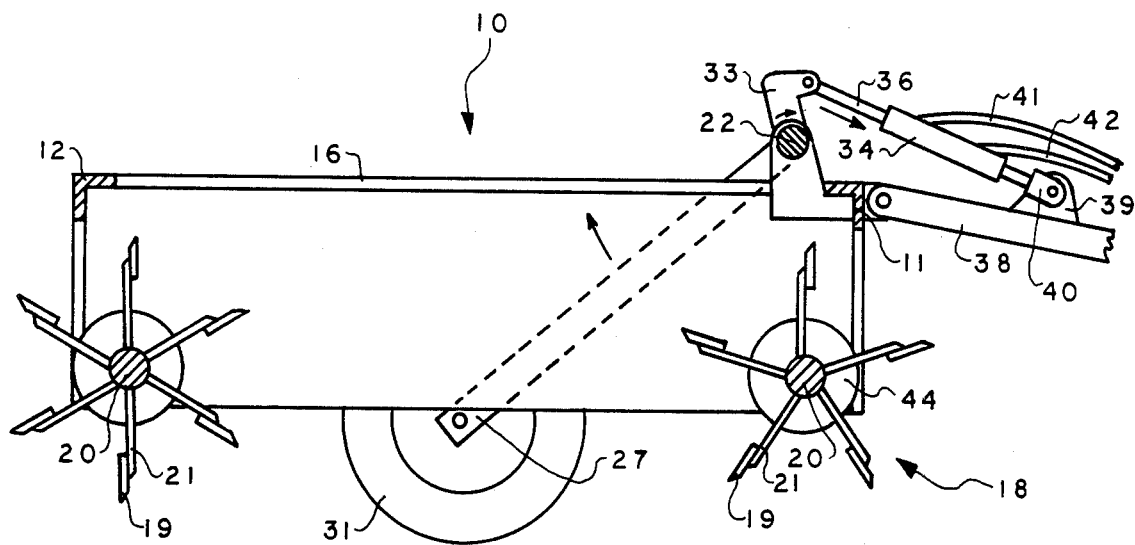
FIG. 2 is a sectional view taken along line 2—2 of FIG. 1 showing the details of the wheel extending and retracting mechanism, including wheel struts attached to a rocker shaft supported by shaft bearings, a rocker lever arm unitarily attached at one end to the rocker shaft for radial motion of the rocker shaft and hence retraction or extension of the wheel struts, and dirve means in the form of a hydraulic cylinder, which is attached to the tongue for supporting and leveling the tongue.
Figure 4:
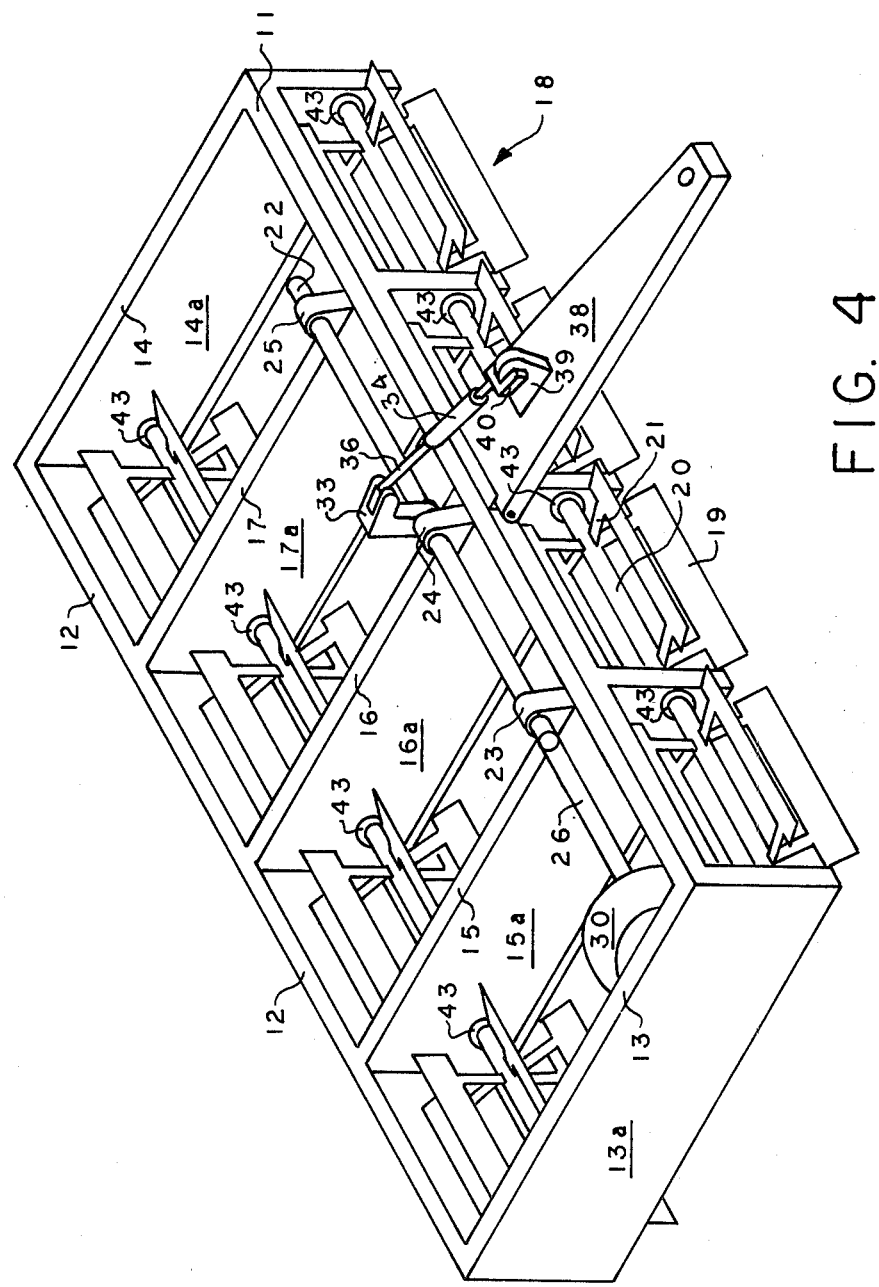
FIG. 4 is a perspective view showing the frame, rotary shredder reels, wheels, wheel extension and retraction system, and the laterally and horizontally adjustable tongue.

Referring now to the Figures, wherein common numerals are used to designate common elements, and specifically to FIGS. 1, 2 and 4, the rotary stalk chopper apparatus generally designated at 10 comprises a horizontally disposed, rigid frame which may be preferably rectangular in shape. The longitudinal axis of the frame extends normal to the direction of travel of the apparatus, which direction is indicated by Arrow A. The frame 10 has a front frame portion 11 and a back portion 12 connected by side members 13, 14 and re-enforcing intermediate frame members 15, 16, 17.

Rotary shredder reels generally 18 are disposed in tandem and extending longitudinal across substantially the entirety of frame front portion 11 and back portion 12. Rotary shredder reels 18 comprise rotary blades 19 extending longitudinally and radially protruding from reel shafts 20 by means of angle irons 21.

A wheel retraction and extension mechanism is provided and includes a rocker shaft 22 journaled for radial turning within rocker shaft bearings 23, 24, and 25. Wheel struts 26, 27 are disposed on and depend downwardly and backwardly from rocker shaft 22. The wheel struts 26, 27 bear axles 28, 29 and wheels 30, 31 at the distal ends thereof.

A rocker lever arm 33 is fixedly secured to rocker shaft 22, such as by welding, for driving rocker shaft 22 in radial motion. A drive means, preferably in the form of a hydraulic cylinder 34, such as may be driven by the hydraulic system of the associated tractor, is pivotally connected to rocker lever arm 33 by means of cylinder rod 35, for providing driving force to turn rocker shaft 22 radially about bearings 23, 24, 25. Hydraulic cylinder 34 is hingedly connected to tongue 38 by means of anchor 39 and U-clamp 40, such that tongue 38 is firmly and resiliently supported both during transportation and chopping and such that tongue 38 is urged into substantially leveled horizontal disposition when the wheel struts 26, 27 are retracted.

Figure 3:
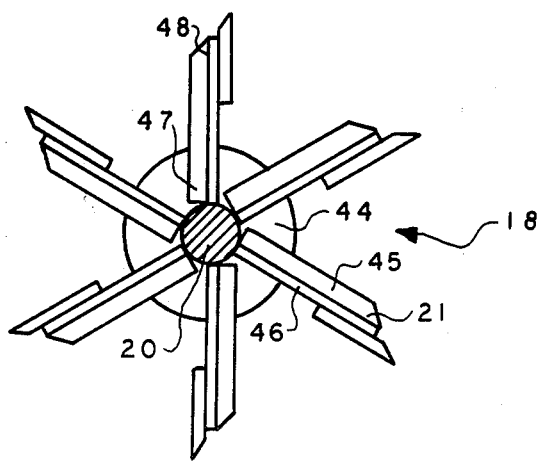
FIG. 3 is an enlarged cross-sectional view of a rotary shredder reel showing the shredder shaft, shredder blades, discs secured to the reel shaft, and angle irons connecting the shredder blades to the discs.

Referring now particularly to FIGS. 3 and 4, side frame members 15, 16, 17 have vertically downwardly extending reel shaft support plates 13a, 14a, 15a, 16a and 17a respectively. Such support plates extend preferably the entire length of the respective supportive frame members and divide the frame into a plurality of compartments for containing the shredder reels and the wheel struts. The plates 13a, 14a, 15a, 16a and 17a support reel shaft bearings 43 which are disposed in paired, facing relationship on adjacent support plates, for independently journaling for rotation each reel shaft 20.

The details of construction of the individual reels 18 are best seen in FIGS. 3 and 4. Referring thereto, at least two discs 44 are fixedly secured, such as by welding, on each shredder shaft 20, preferably near and equidistant from the ends thereof. Angle irons 21 having a first angle side 45 and a second angle side 46 disposed at 90° to first side 45 are fixedly secured, such as by bolting and/or welding, at a proximal end 47 and by means of first angle side 45 to the disc 44. The second angle side 46 is bolted and/or welded to the shredder blade 19 at the distal end 48 of the angle iron 44, whereby each such shredder blade 19 is supported near each of its ends by an angle iron 21. The angle irons 21 are disposed radially and equicircumferentially about reel shafts 20 to support the shredder blades 19 longitudinally of the reel shafts 20 and in radial protrusion therefrom.

In an alternative embodiment (not shown) the discs 44 and attached angle irons 21 may be mounted on a sleeve which is disposed on and secured to the reel shaft. That alternative structure would function in essentially the same manner as the structure shown.

In one preferred embodiment the rotary shredder reels 18 disposed below front frame portion 11 have five shredder blades per shaft and the rotary shredder reels 18 disposed below back frame portion 12 have six shredder blades per shaft, thereby to prevent tracking and hence missing of any vegetation during chopping.

Portions of the frame may be hollow for filling with a liquid for supplying supplementary weight to the apparatus for greater stability and efficiency in the field. Alternatively, supplementary weight bearing pans may be carried by the frame.

The materials used are preferably $\frac{1}{4}''$ steel for strength and durability. The four-row shredder, as illustrated in the Figures would weigh approximately 2600 pounds, for a shredder apparatus approximately 6 feet long (less tongue) and 13 feet wide. The tongue is preferably approximately 6 feet in length. No particular criticality is found in the specific dimensions disclosed and the rotary apparatus of the present invention may be constructed to cover any convenient number of rows of vegetation.

Preferably, the shredder shafts are approximately 2 inches in diameter and the rocker shaft is approximately $3\frac{1}{2}$ inches in diameter. The diamter of a rotary shredder reel is approximately 22 inches. Likewise, these particular dimensions may be varied.

The basic and novel characteristics of the present invention and the advantages thereof will be readily understood from the foregoing disclosure by those skilled in the art. It will become readily apparent that various changes and modifications may be made in the form, construction and arrangement of the combination apparatus set forth hereinabove without departing from the spirit and scope of the invention. Accordingly, the preferred and alternative embodiments of the present invention set forth herein above are not intended to limit such spirit and scope in any way.

What is claimed is:

1. A rotary apparatus which is towable behind an agricultural vehicle for high speed operation in chopping vegetation and for churning and working the soil, and for high speed transportation to and from the field, said apparatus comprising:

a horizontally disposed, rigid frame having a lateral axis in the direction of pulling and a longitudinal axis normal to the direction of pulling, and defining front and rear portions thereof;

a plurality of downwardly extending shaft support plates disposed in spaced relation to said frame to define thereby a plurality of compartments for containing rotary shredder reels;

a plurality of rotary shredder reels disposed in tandem within each compartment defined by said downwardly extending shaft support plates to form front and rear shredder assemblies, each rotary shredder reel having a reel shaft, a plurality of shredder blades connected to and extending longitudinally of each said reel shaft and radially protruding therefrom, and means for connecting said shredder blades to said reel shaft in radial and equicircumferential disposition, whereby said shredder blades are rapidly rotated by their engagement with the earth in response to such high speed towing of the apparatus along the ground, thereby to chop any vegetation within their path and simultaneously to churn and work the soil;

paired, facing reel shaft bearing means carried by said support plates for journaling each of said reel shafts for independent rotation;

wheel extension and retraction means carried in downward and rearward disposition for absorbing shocks to said wheel extension and retraction means such as may result from such rapid transportation thereof over rough ground during such high speed towing to and from the field, said wheel extension and retraction means carried by said frame for raising and lowering said frame between a raised position for transportation of the rotary apparatus to and from the field, and a lowered position for disposing the rotary shredder reels in operative contact with the surface of the ground for chopping present vegetation and for working and churning the soil;

wheel means borne by said wheel extension and retraction means, said wheel means movable by means of said wheel extension and retraction means from a first disposition in contact with the ground corresponding to the lowered position of said wheel extension and retraction means and a second disposition above the ground corresponding to the raised position of said wheel extension and retraction means to dispose said rotary shredder reels below the level of said wheel means, said wheel means disposed approximately equidistant said front and rear shredder assemblies with respect to the lateral axis of said frame and disposed interior of the extremities of said shredder assemblies approximately equidistant from and laterally to said lateral axis, to dispose the center of gravity of the rotary apparatus substantially equidistant and substantially between said wheel means, whereby the high speed rotary apparatus is substantially symmetrically balanced both laterally and longitudinally for rapid chopping progress across the field of stalks to be chopped and for rapid transportation to and from the field to be worked; and a tongue for connecting the rotary apparatus to the agricultural vehicle, said tongue hingedly connected to the front portion of said frame for limited radial motion about the longitudinal axis of said frame, said tongue operatively connected to said wheel extension and retraction means for urging said tongue radially downward during extension of the wheel means and radially upwardly during retration, whereby the effective weight on said front and rear portions of said frame may be maintained in substantially balanced symmetry when said frame is lowered for chopping.

2. The rotary apparatus of claim 1 wherein said wheel xtending and retracting means comprises:

a plurality of rocker shaft bearings supported by and extending longitudinally on said frame;

a rocker shaft supported by and journaled for rotational motion within said rocker shaft bearings;

wheel struts bearing said wheel means at one end thereof and fixedly secured to said rocker shaft at the other end thereof;

rocker lever means attached at the proximal end thereof to said rocker shaft for turning said rocker shaft in said rocker shaft bearings in one radial direction for retraction of said wheel means and in the opposite radial direction for extension of said wheel means; and drive means attached to the distal end of said rocker lever means for providing force for rotational motion of said rocker shaft in said rocker shaft bearings, whereby upon actuation of said drive means said rocker lever means turns said rocker shaft in one radial direction within said rocker shaft bearings thereby to retract said wheel struts for lowering said frame and in the opposite radial direction within said rocker shaft bearings thereby to extend said wheel struts for raising said frame.

3. The rotary apparatus of claim 2 wherein said drive means comprises a fluidic cylinder.

4. The rotary apparatus of claim 3 wherein each said wheel strut is disposed to extend downwardly and backwardly within a said compartment defined by said plates and substantially equidistant from said front and rear positions of said frame to place in conjunction with said interconnected tongue structure substantially equal effective amounts of weight on said front and rear portions of said frame.

5. The rotary apparatus of claim 1 wherein said means for connecting said shredder blades to said reel shaft in radial and equicircumferential disposition comprises:

at least two discs disposed on and secured to said reel shaft to project radially therefrom and transverse to the longitudinal axis of said reel shaft, each said disc having an axis of rotation concentric with that of said reel shaft; and a plurality of angle irons each of which radially protrudes in equicircumferential disposition about said shaft and radially from the circumference of a said disc, and is fixed at the proximal end thereof to said disc and at the distal end thereof to a said blade, each said blade protruding radially from said reel shaft along the entire length of said shredder blades for operative engagement with and penetration into the ground.

6. The rotary apparatus of claim 5 wherein said discs are disposed near to and equidistant from the ends of the shaft.

7. The rotary apparatus of claim 5 wherein said discs are disposed externally of said angle irons with respect to said shaft.

8. The rotary apparatus of claim 1 wherein the rotary shredder reels disposed in tandem within the compartments defined by said reel shaft support plates have a different number of blades per shredder reel.

9. The rotary apparatus of claim 1 wherein each said shredder blade includes chisle-shaped edge means on the operative surface thereof for chopping stalks and for engagement of said chisle-shaped edge means with the earth.

* * * * *

UNITED STATES PATENT OFFICE
CERTIFICATE OF CORRECTION

PATENT NO. : 4,150,724
DATED : April 24, 1979
INVENTOR(S) : Dwight W. Strobel

It is certified that error appears in the above-identified patent and that said Letters Patent are hereby corrected as shown below:

Column 1, line 14, "tp" should be -- to --.

Column 1, line 35, "and adjustability chopping, slowness of operation, and" should be -- and adjustability to varying terrain and soil conditions,--.

Column 1, line 36, "the necessity for an to varying terrain and soil condi-" should be -- incompleteness of chopping, slowness of operation, and --.

Column 1, line 37, "tions, incompleteness of" should be -- the necessity for an --.

Column 2, line 40, "wheelextending" should be -- wheel extending --.

Signed and Sealed this

Fourteenth Day of August 1979

[SEAL]

Attest:

Attesting Officer

LUTRELLE F. PARKER
Acting Commissioner of Patents and Trademarks